Nov. 8, 1966   C. V. ECKSTROM   3,284,032
SHAPED PARACHUTE WITH STABLE FLIGHT CHARACTERISTICS
Filed May 19, 1964
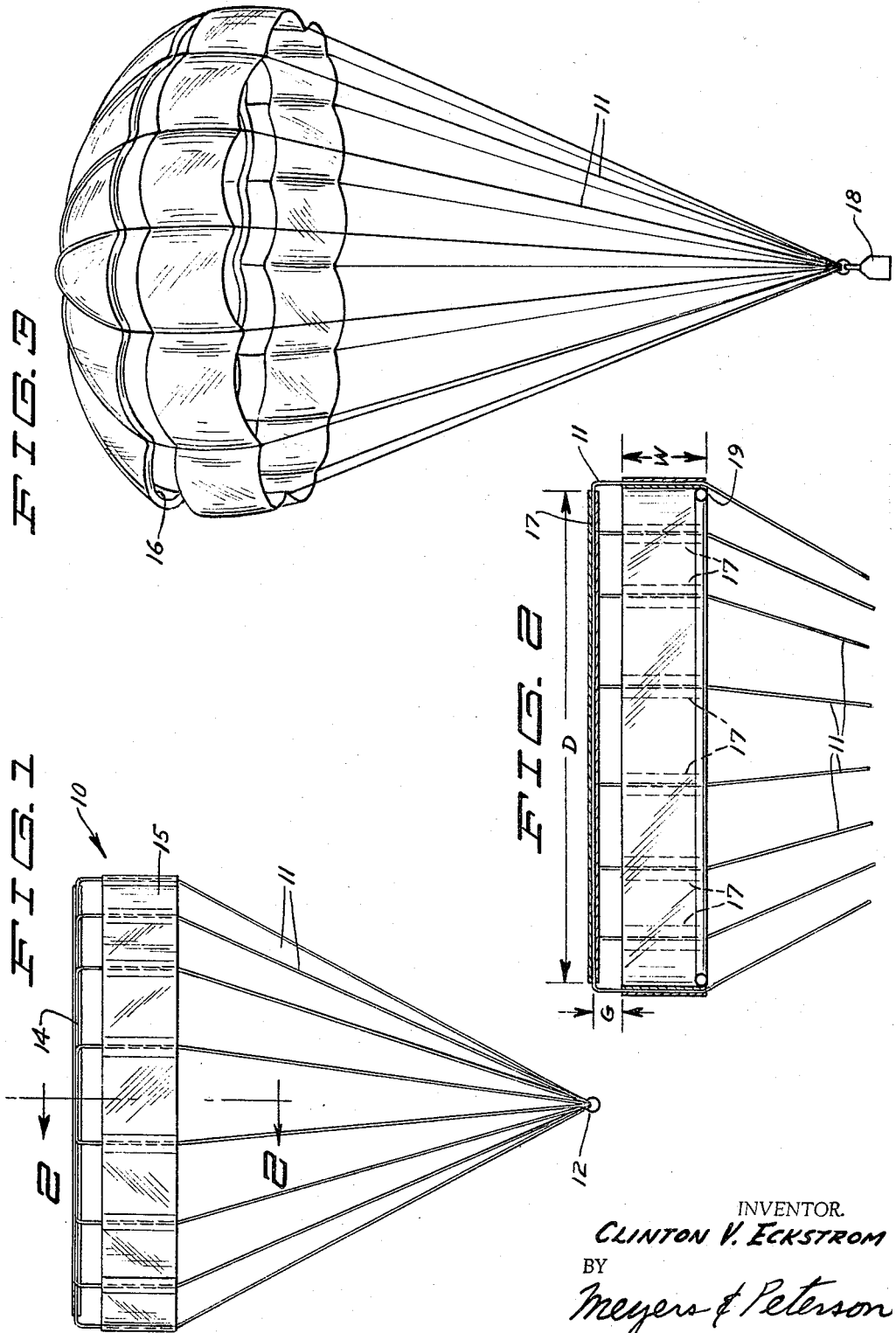
INVENTOR.
CLINTON V. ECKSTROM
BY
Meyers & Peterson
ATTORNEYS

United States Patent Office 3,284,032
Patented Nov. 8, 1966

3,284,032
SHAPED PARACHUTE WITH STABLE FLIGHT CHARACTERISTICS
Clinton V. Eckstrom, Faribault, Minn., assignor to G. T. Schjeldahl Company, Northfield, Minn., a corporation of Minnesota
Filed May 19, 1964, Ser. No. 368,646
8 Claims. (Cl. 244—145)

The present invention relates generally to an improved parachute, and more specifically to a shaped parachute with stable flight characteristics.

In the manufacture of parachutes and parachute structures, it is normally necessary to provide for the passage of air through the parachute canopy in order to achieve aerodynamic stability. This has sometimes been accomplished with the use of air permeable material for the canopy. However, with the advent of non-porous material, including plastic films and the like, which films have sufficient strength to withstand the rigors of operation as a parachute canopy, a modified means of permitting permeation of air through the canopy must be devised. An example of material which is commercially available and which has sufficient strength to withstand the rigors of operation as a parachute canopy is stress oriented polyethylene terephthalate, this material being commercially available from E. I. du Pont de Nemours & Company under the code name of Mylar. If desired, this film material may be reinforced with a suitable scrim or webbing, as the demands of the operations may indicate.

The non-porous films as indicated hereinabove are widely available in a variety of film thicknesses, widths and lengths. This availability is limited to flat sheets of material, and hence, for economic reasons, it is desirable to utilize flat material for forming the canopy. As indicated, venting of the canopy is required in order to achieve aerodynamic stability, however, this stability is usually achieved at the expense of reducing the load supporting ability. In this context, load supporting ability is defined as the ability of the parachute to resist movement through an air or other aqueous stream.

Specifically, the parachute canopy consists of three distinct features or portions; a disc or canopy roof, a cylindrical band to form a skirt for the inflated parachute canopy and disposed adjacent to the edge of the disc, and a gap or slot being interposed between the disc and the band in order to permit air to escape from the interior of the parachute canopy. In the fabrication of the parachute canopy, the disc is disposed along a certain predetermined plane and the cylindrical band is disposed so that the central axis thereof is generally perpendicular to the plane of the disc.

Therefore, it is an object of the present invention to provide an improved aerodynamically stable disc-band parachute having a canopy which is capable of being prepared from non-porous flat, planar material.

It is yet a further object of the present invention to provide an improved disc-band parachute having a canopy which has a design providing improved aerodynamic stability.

It is yet a further object of the present invention to provide an improved disc-band parachute canopy which provides an optimum relationship between the area of material used to shape the canopy and the area of the canopy which is projected toward the air stream.

Other and further objects of the present invention will become apparent to those skilled in the art upon a study of the following specification, appended claims, and accompanying drawing wherein:

FIGURE 1 is an elevational view of a parachute fabricated in accordance with the present invention;

FIGURE 2 is a vertical sectional view of the canopy portion of the parachute shown in FIGURE 1 and taken along the line and in the direction of the arrows 2—2 of FIGURE 1; and FIGURE 3 is a perspective view of an inflated parachute canopy prepared in accordance with the present invention.

In accordance with the preferred modification of the present invention, the parachute structure shown in FIGURE 1 comprises a canopy portion generally designated 10 together with a plurality of suspension lines or supporting cords 11—11 arranged in depending relationship therefrom. Normally, 12 evenly spaced lines will be utilized, each line extending entirely over the canopy. The load carrying member such as the ring 12 is disposed at the adjoining ends of each of the suspension lines 11—11, this point forming the apex of a solid angle or cone which includes the canopy structure 10 of the parachute. The canopy 10 includes a disc 14 together with a band 15, the disc and band being fabricated from polyethylene terephthalate, stress oriented on curing, this material being available commercially. The thickness of the polyethylene terephthalate film is adequate to withstand the physical requirements of the parachute including load carrying capability, ultimate or predicted exposure to turbulent conditions. The lines 11 are preferably fabricated from a material such as nylon or the like.

Referring now to the disc 14, it will be observed that this disc has a certain predetermined diameter D. Again, for purposes of maintaining adequate lift, a load of 5 to 50 and possibly up to 100 pounds may be suspended and dropped to earth over an extended elevation by employing a parachute having a structure in accordance with the present invention wherein the diameter of the disc, D, is in the range of 12 feet. The remaining dimensions will be, of course, dependent and closely interrelated to this diametrical dimension. In this regard, the axial length of the generally circular cylindrical band 15, such as is represented by the dimensions W of FIGURE 2, will be in the range of from between 15 percent and 18 percent of the disc diameter D. In other words, for stability the ratio is $$W/D = X$$

wherein the value of X is from between 0.15 and 0.18.

The band 15 is spaced from the disc 14 by a gap dimension which is defined in FIGURE 2 by the dimension G. This gap area 16 provides a geometrical opening or slot wherefrom air on the interior of the canopy exits and disrupts the outer air flow at a particular point on the geometry of the canopy. This gap, as indicated, is located at the point of greatest diameter in the inflated structure, and hence the effect is more pronounced at this location than it would be at another location. In the equation $$G/D = Y$$

the value of Y is between 0.04 and 0.09. If the value of Y falls below 0.04, the aerodynamic stability of the parachute is diminished, and if the value exceeds about 0.09, the disc will not be completely filled during descent. Thus, the ratio is critical.

The main disc 14 may be provided with a vent opening or the like at the apex of the canopy for convenience when packing, this being accomplished without changing the major characteristics of the parachute.

With attention directed to FIGURE 2 of the drawing, it will be observed that the lines 11 extend over the top of the parachute canopy. If desired, a composite or laminated disc may be employed wherein there are provided a pair of films having the lines 11 held therebetween, or, in the alternative, a relatively wide tape may be sealed against the surface of the disc and line in order to confine the line therebetween. This tape is indicated at 17 in FIGURE 2.

The inflated configuration is shown in FIGURE 3 of the drawing. In this figure, it will be observed that the disc assumes a parabolic shape when the parachute is in a descent and carrying a load such as is indicated at 18. The gap area 16 is disposed at the point of greatest diameter for the canopy structure. This configuration provides a geometric opening or slot which disrupts the outer air flow at a particular point on the geometry of the canopy.

The parachute of the present invention is adaptable to utilize a toroidal member about the periphery of the disc or the band in order to assist in opening the chute. In this connection, at high altitudes (such as over 100,000 feet) the toroidal member may be prepared from semi-rigid materials such as polyethylene or the like, although other materials such as inflatable polyethylene terephthalate may be utilized as well. For example, a closed inflatable toroidal member may be secured to the inner surface of the band such as at 19 in FIGURE 2. Upon leaving the carrier or device utilized to achieve the desired altitude, such as a balloon, rocket, or airplane, the toroidal member 19 may be inflated in order to assist in opening the parachute canopy.

While the parachute of the present invention is adaptable for a multitude of uses, it is particularly desirable for use in connection with meteorological determination efforts, specifically for use at altitudes above 100,000 feet and up to 350,000 feet. In this regard, the meteorological equipment may be carried aloft by a balloon, rocket, or aircraft, and may be dropped to earth from a certain predetermined altitude. The payload, which would then comprise an instrument package, would be dropped back to the surface of the earth for recovery. The parachute will assist the payload in returning to the earth to render the landing reasonably soft.

In one specific modification, a disc structure was prepared having a diameter of 12 feet, and a generally cylindrical band having an axial length of 23.7 inches was associated therewith. The gap between the disc and the band was 8.15 inches, this providing a nominal diameter of the parachute of 16.45 feet, and a percent open area of 12 percent. This parachute exhibited substantial stability and the design appeared to be at an optimum. The following parachutes have been prepared and studied:

TABLE I

| Configuration | Nominal Diameter (Feet) | Open Area (percent) | Disc Diameter (Feet) | Gap Width (Inches) | Band Width (Inches) | Material Thickness (Mils) |
| --- | --- | --- | --- | --- | --- | --- |
| 1 | 16.45 | 12.0 | 12 | 8.15 | 23.7 | .5 |
| 2 | 16.80 | 15.0 | 12 | 10.50 | 24.0 | .5 |
| 3 | 18.30 | 14.3 | 12 | 12.00 | 36.0 | .5 |

In the canopy, the area of the gap should comprise between 10 percent and 18 percent of the area of the entire canopy for purposes of stability. At 10 percent open, there is a modest tendency for the parachute to swing about a solid pendular angle, however, as the percentage of open area increases to about 15 percent, there is complete stability and a total lack of a tendency to rock or sway. Gap areas in excess of about 18 percent tend to decrease the load supporting ability of the structure.

It will, of course, be understood that various changes may be made in the form, details, arrangements and proportions of the parts without departing from the scope of the invention as set forth in the appended claims.

What is claimed is:

1. A parachute including a canopy with a plurality of elongated supporting cords secured thereto and extending therefrom, said canopy comprising a central disc having a certain predetermined diameter and being disposed along a certain plane, and a generally circular cylindrical band having a central axis which is substantially normal to said certain plane disposed in spaced relationship to said disc, having a diameter substantially equal to said predetermined diameter and defining a gap area therebetween, said generally cylindrical band having an axial length which is between about 15 percent and 18 percent of said disc diameter, the gap between the edge of said disc and the edge of said cylindrical band being between about 4 percent and 9 percent of said disc diameter.

2. The parachute as defined in claim 1 being particularly characterized in that said canopy is fabricated from non-porous sheet material.

3. The apparatus as defined in claim 1 being particularly characterized in that an expandable toroidal member is secured to the base of said circular cylindrical band.

4. The parachute as defined in claim 1 being particularly characterized in that said generally cylindrical band has an axial length which is about 16 percent of said disc diameter.

5. The parachute as defined in claim 1 being particularly characterized in that said gap is about 5.5 percent of said disc diameter.

6. A parachute including a canopy with a plurality of elongated supporting cords secured thereto and extending therefrom, said canopy being fabricated from thin, non-porous, sheet material and comprising a central disc having a certain predetermined diameter and being disposed along a certain plane, said canopy further comprising a circular cylindrical band having a diameter substantially equal to said predetermined diameter and having a central axis which is substantially normal to said certain plane, disposed in spaced relationship to said disc and which defines a gap area therebetween, said generally cylindrical band having an axial length which is between about 15 percent and 18 percent of said disc diameter, the gap between the edge of said disc and the edge of said cylindrical band being between about 4 percent and 9 percent of said disc diameter.

7. The parachute as defined in claim 6 being particularly characterized in that said thin sheet material consists essentially of polyethylene terephthalate.

8. A parachute including a canopy with a plurality of elongated supporting cords secured thereto and extending therefrom, said canopy comprising a central disc having a certain predetermined diameter and being disposed along a certain plane, and a generally circular cylindrical band having a central axis which is substantially normal to said certain plane disposed in spaced relationship to said disc and defining a gap area therebetween, said generally cylindrical band having a diameter substantially equal to said predetermined diameter and a certain predetermined axial length, the gap between the edge of said disc and the edge of said cylindrical band comprising from between 10 percent and 18 percent of the aggregate area of said canopy.

References Cited by the Examiner

UNITED STATES PATENTS 2,472,601   6/1949   Mallory _____ 244—145
3,127,137   3/1964   Downing _____ 244—146

FOREIGN PATENTS 89,915   11/1922   Austria.
69,029   12/1951   Netherlands.

OTHER REFERENCES

Aviation Week and Space Technology, October 8, 1962, page 32.

MILTON BUCHLER, *Primary Examiner.*

ALFRED E. CORRIGAN, *Examiner.*

UNITED STATES PATENT OFFICE
CERTIFICATE OF CORRECTION

Patent No. 3,284,032            November 8, 1966

Clinton V. Eckstrom

It is hereby certified that error appears in the above numbered patent requiring correction and that the said Letters Patent should read as corrected below.

Column 1, line 42, for "aqueous" read -- gaseous --.

Signed and sealed this 12th day of September 1967.

(SEAL)
Attest:

ERNEST W. SWIDER
Attesting Officer

EDWARD J. BRENNER
Commissioner of Patents